United States Patent [19]

Haas et al.

[11] Patent Number: 4,677,618
[45] Date of Patent: Jun. 30, 1987

[54] METHOD AND APPARATUS FOR DESKEWING WDM DATA TRANSMITTED THROUGH A DISPERSIVE MEDIUM

[75] Inventors: Lee C. Haas, Raleigh; Mitchell L. Loeb, Durham, both of N.C.

[73] Assignee: International Business Machines Corporation, Armonk, N.Y.

[21] Appl. No.: 719,927

[22] Filed: Apr. 4, 1985

[51] Int. Cl.[4] .............................................. G06F 11/00
[52] U.S. Cl. ........................................... 371/1; 360/26
[58] Field of Search ............... 371/1; 360/26; 364/900

[56] References Cited

U.S. PATENT DOCUMENTS

| | | | |
|---|---|---|---|
| 3,264,622 | 8/1966 | Gerlach | 360/26 |
| 3,427,591 | 2/1969 | Nishioka | 360/26 X |
| 3,728,679 | 4/1973 | McIntosh | 371/1 |
| 4,024,498 | 5/1977 | McIntosh | 371/1 |
| 4,497,056 | 1/1985 | Sugamori | 371/1 X |

Primary Examiner—Charles E. Atkinson
Assistant Examiner—Robert W. Beausoliel, Jr.
Attorney, Agent, or Firm—Gerald R. Woods

[57] ABSTRACT

When a byte of digital data is transmitted through a dispersive medium using frequency or wavelength division multiplexing (WDM) techniques, individual bits in the byte are normally delayed different amounts of time. This is referred to as bit skew. WDM apparatus is described along with a system for deskewing WDM data received after transit through a dispersive medium. Two bits in a given byte of data are detected. The relative times of arrival of the remaining bits in a byte are predicted using the relative delay between the two detected bits and the known frequency-related dispersion characteristics of the transmission medium. Certain bits in each received byte may be delayed using clock delay lines or registers to reduce the amount of time skew between the various bits in a byte.

13 Claims, 11 Drawing Figures

METHOD AND APPARATUS FOR DESKEWING WDM DATA TRANSMITTED THROUGH A DISPERSIVE MEDIUM

TECHNICAL FIELD

The present invention relates to data communications and more particularly to a method and apparatus for deskewing wavelength division multiplexed data transmitted through a dispersive medium.

BACKGROUND OF THE INVENTION

Information is handled in digital computers in the form of words or bytes, where a byte consists of a fixed number of binary digits or bits. When information must be transferred between two locations within the computer, the byte is usually transferred in parallel over a multi-wire bus connecting the two locations.

When the same byte must be sent to a location outside the computer, it is often sent one bit at a time or serially. The advantages of serial transmission over parallel transmission include the lower cost of a single wire compared to a multi-wire cable, the fewer number of connectors required and the smaller size and weight of the single wire cable.

Each byte must be serialized (converted to a string of bits) at the transmitting apparatus and then deserialized (reassembled into byte form) at the receiving apparatus. The receiving apparatus must be able to identify the beginning and end of each byte in the serial stream of data. This can be done with special bit patterns. Since the special patterns have no information content, the effective transmission rate is reduced. Also, when information is being transferred between computers that operate at comparable speeds, serial data must be transmitted at a rate equal to the internal computer transfer rate multiplied by the sum of the number of bits per byte plus the number of bits required to define any special patterns. Obviously, the amount of data that can be transmitted between two computers in a given unit of time is considerably less where data is transmitted serially rather than in parallel.

There has been a good deal of interest in frequency or wavelength division multiplexing as a technique which might be used to accomplish parallel data transmission on a serial transmission link such as single wire or a single optical fiber. In an optical wavelength division multiplexing (or WDM) system, the individual data bits in a byte are applied to different encoders in a set of optical encoders. The encoders modulate each bit or channel at a different optical frequency or wavelength. The modulated optical signals are merged and transmitted through a single fiber to a receiving location. At the receiving location, the light beam is separated, using optical filters or gratings, into its bit signal components to re-establish the original byte form of the data.

One known problem in using wavelength division multiplexing in an optical fiber system is that an optical fiber is a dispersive medium which tends to delay optical signals at some frequencies more than optical signals at other frequencies. Since a byte of WDM data consists of signals at different frequencies or wavelengths, the effect of dispersion is to delay some bits in the byte more than other bits in the same byte. The longer the optical fiber, the greater the relative delay which may occur between the individual bits in a WDM byte of data. The net effect of the frequency-related dispersion is that not all bits in a single WDM byte may arrive at a receiving location at the same time even though all may have been transmitted at the transmitting location at the same time. The arrival of bits in a given byte at different times is referred to as bit skew.

If the transmission rate is not too high or the length of the transmission link is not too long, the amount of bit skew may remain within acceptable limits. However, for high transmission rates and/or longer transmission links, the skew may become large enough that bits in one byte at least partially overlap bits in another earlier or later byte.

The dispersion characteristics of common transmission mediums, such as optical fibers, are well known for wavelengths that are of interest for data transmission. If the exact length of a transmission path is known, the retardation or delay of a bit transmitted at a particular wavelength can be readily calculated.

Unfortunately, the exact length of transmission links in practical, commercial communications systems is not normally known. The exact length of a transmission link depends on the manner in which it is installed and will vary from one installation to the next, depending on the installer's techniques. Even if the exact length is known initially, it can change if connectors and/or sections of fiber must be replaced after installation.

Because the exact length of an optical fiber is not normally known, other solutions for dealing with the problem of bit skew have been proposed.

One way to deal with bit skew is to limit the transmission rate to avoid overlap between successive bytes. This, of course, limits the maximum permissible data transfer rate, which is undesirable as being contrary to the basic reasons for using wavelength division multiplexing as a data transmission technique.

Another potential technique for dealing with the problem of bit skew is to require that the transmitting system head each message with a series of special bit patterns which, when detected, can be used to determine the time of arrival of the bits in each of the parallel channels. The special bit patterns have the disadvantage that they represent "overhead" which reduce the effective throughput of the system.

SUMMARY OF THE INVENTION

The present invention is a method and system for compensating for bit skew in a wavelength division multiplexing communications system. The method and system do not require knowledge of the exact length of the transmission path, special bit patterns or artificial limits on transmission rates.

Bits in parallel bit channels are detected at a deskewing location and the relative delay between two bits in predetermined bit channels is determined. In one embodiment, the selected bit channels are those in which the least amount of delay is known to occur. The relative time of arrival of the bit in each of the remaining channels is established as a function of the determined relative delay between the two "fastest" bits, the frequencies or wavelengths of the remaining channels and the known dispersion characteristics of the transmission medium.

In one embodiment, delay clocks are generated as a function of the anticipated relative delays. In given bit channels, bits are clocked through signal-delaying elements at times which reduce the relative skew between the "fastest" and "slowest" bits in a given byte of data.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

TECHNICAL DESCRIPTION

Figure 1:
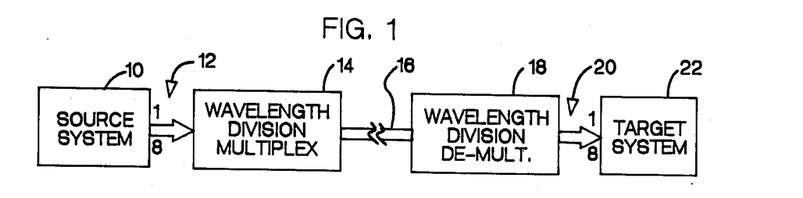
FIG. 1 is a high level block diagram of a system within which the present invention may be practiced.

FIG. 1 is a system diagram intended to show the environment in which the present invention can be used. The environment includes a source system 10 which can be any kind of digital data processing system or device capable of presenting digital data to be transmitted on a parallel bus 12. An 8-bit- wide bus (8 data channels) is shown for purposes of illustration only. Buses of other widths can be used, the only limitation being that a wavelength division multiplexing circuit 14 must be capable of handling all data channels in the selected bus. The function of the wavelength division multiplexing circuit 14 is to optically encode each bit presented on the bus 12 and to optically combine or merge the optical bit signals to provide a single multi-wavelength signal which is transmitted through a transmission medium 16 (such as an optical fiber) having frequency-related dispersion characteristics. The signal is received by a wavelength division demultiplexing circuit 18 which decomposes the multi-wavelength signal into parallel signals, each at a single wavelength. The bit signals are transmitted over a parallel bus 20 to a target system 22 which, like the source system 10, can be any sort of digital data processing system or device.

Figure 2:
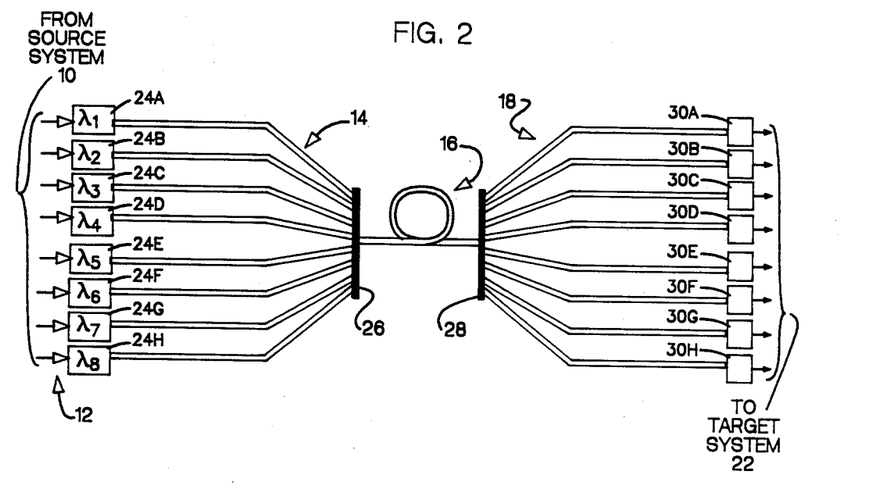
FIG. 2 is a more detailed diagram of the wavelength division multiplexing and demultiplexing sections of the system shown in FIG. 1.

FIG. 2 provides more detail on the wavelength division multiplexing circuit 14 and wavelength division demultiplexing circuit 18. The bit stream in each channel of the parallel bus 12 is used to modulate an optical source 24A through 24H which provides an output optical signal at a predetermined optical frequency or wavelength. These optical signals are transmitted through optical fibers to an optical combiner 26 which combines or merges the individual optical signals to form a composite (multi-wavelength) signal which is transmitted through optical fiber 16 to an optical grating 28 at a receiving system. The optical grating 28 decomposes the received signal into its constituents and sends each of the constituents to a separate optical detector 30A through 30H optimized for one of the wavelengths of light produced by the optical sources 24A through 24H. The electrical bit signals produced by the optical detectors 30A through 30H are transmitted to the target system 22.

Figure 3:
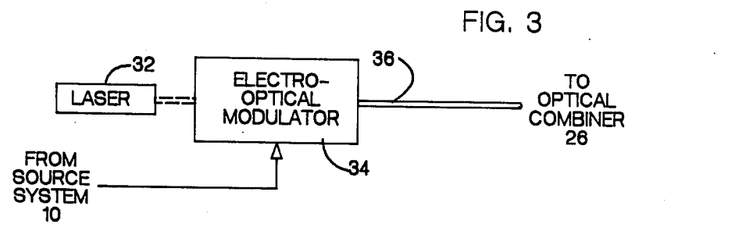
FIG. 3 is a block diagram of an optical modulation technique which can be used in the system.

FIG. 3 is a schematic diagram of one of the optical sources in the system. Each optical source includes a laser 32 capable of producing a light beam at a predetermined wavelength. The output beam from laser 32 is modulated by a conventional electro-optical modulator element 34 under the control of signals in one of the bit channels from source system 10. The modulated optical signal is transmitted through an optical fiber 36 to the optical combiner 26.

Figure 4:
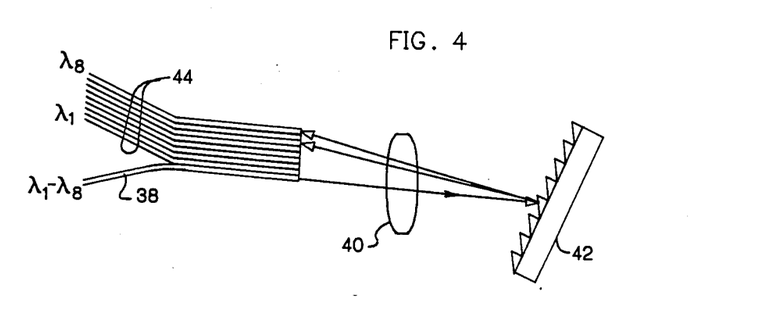
FIG. 4 shows one type of an optical multiplexer/-demultiplexer component.

The functions performed by the optical combiner or multiplexer 26 and the optical grating or demultiplexer 28 can be performed using the same component with appropriate changes in beam directions. FIG. 4 shows one type of component which can be used to perform both functions. In the drawing, the beam directions are such that the illustrated elements will perform the beam separating function. Specifically, a composite or multi-wavelength optical signal reaches the apparatus through an input fiber 38. The composite signal is focussed by a lens 40 onto a reflection grating 42. The dimensions of the reflection grating 42 are greatly exaggerated in comparison to the dimensions of other elements in the combination. In practice, the beam emanating from the input fiber 38 would produce a beam spot large enough to cross a considerable number of grating lines on the reflection grating 42. In accordance with well known optical principles, the reflection grating 42 reflects components of the composite light beam along different paths as a function of the wavelengths of the components. A number of optical fibers, referred to collectively as output fibers 44, are positioned so that each of the output fibers receives optical energy having a particular wavelength corresponding to one of the wavelengths of the optical sources in multiplexer 14. Each of the output fibers in the set 44 is connected to a different one of the optical detectors 30A through 30H.

The same set of components can be used to perform the combining or multiplexing function. The bit channel signals generated by the optical sources 24A through 24H would be applied to the fibers in the set 44. The applied signals would be focussed by lens 40 onto the reflection grating 44. While the incoming optical signals are incident on the surface of the reflection grating 42 at different angles, the different wavelengths of the incoming signals cause all to be reflected along a common path impinging on fiber 38. Fiber 38 thus carries the composite or multi-wavelength signal which is transmitted to a receiving location.

Figure 5:
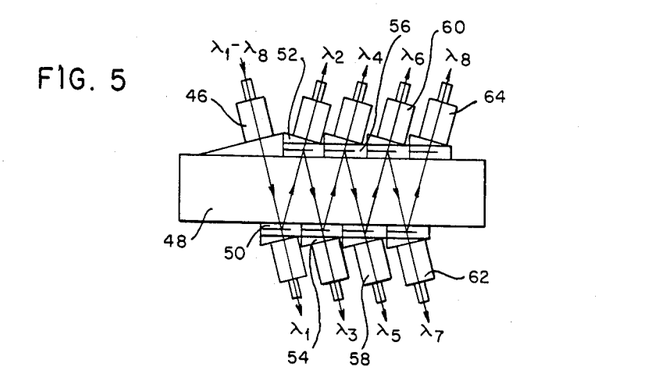
FIG. 5 shows another type of optical multiplexer/-demultiplexer component.

FIG. 5 shows an alternate device capable of multiplexing and demultiplexing optical signals. The figure is illustrated with light rays that would be produced during operation as a demultiplexer. An incoming composite optical signal is applied to an input fiber 46 which directs the signal through a glass plate 48 to an optical bandpass filter 50 which passes light only at a predetermined wavelength while rejecting or reflecting light at all other wavelengths. The remaining optical energy is reflected towards a second filter 52 which passes only that light at a second predetermined wavelength while reflecting light at all other wavelengths. Optical energy is either passed or reflected at a series of other filters 54, 56, 58, 60, 62 and 64, each of which operates to pass light only within a bandpass centered on a selected frequency. The optical signals carried on fibers connected to each of the filters carry the individual optical signals.

By reversing the input and output of the device shown in FIG. 5, the device can be used to perform a multiplexing function. Optical signals produced by the optical sources 24A through 24H would be applied at the fibers connected to the filters 52, 54, 56, 58, 60, 62 and 64. Incoming optical signals will be passed only by the filter at the input port and will be reflected by all other filters to form a composite or multi-wavelength signal which will exit the device through fiber 46.

The speed with which light travels through an optical fiber is dependent on the wavelength of the light. This occurs because of the interaction of the light waves with the molecules of the glass in the fiber. The waves cause the molecules to oscillate and thus radiate new waves at the same wavelength as the original waves, but with a different phase relationship. The new waves interfere with the original waves and give the appearance of a slower wave.

Figure 8:
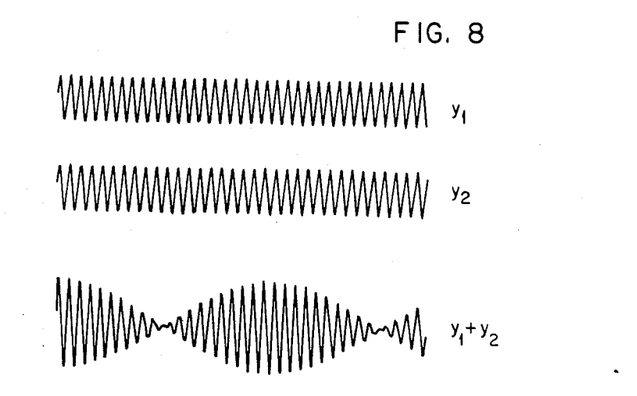
FIG. 8 shows the summation of two light waves and is used in explaining the terms "group velocity" and "phase velocity"

The terms group velocity and phase velocity are used to describe this phenomena, particularly where the light wave actually consists of optical energy having different wavelengths. FIG. 8 shows two sinusoidal waveforms Y1 and Y2 which could represent optical signals at slightly different frequencies. It can be shown mathematically that the addition or superposition of the waveforms Y1 and Y2 will produce a signal such as Y1+Y2 with a slowly varying pulse envelope enclosing more rapid oscillations, also known as the carrier. The group velocity of this waveform is the velocity of the envelope along the transmission medium while the phase velocity is the velocity of the carrier along the medium.

For a non-dispersive medium, such as free space, the group velocity and the phase velocity are the same. The pulse envelope will travel with the frequency of the carrier. In a dispersive medium, however, the phase velocity is not a constant for all frequencies or wavelengths. The fact that phase velocity varies as a function of wavelength affects a transmitted optical pulse in two ways. First, the shape of the pulse changes as it travels through the transmission medium. Second, the constituent bits in a wavelength division multiplexed signal will be skewed or shifted relative to one another and, if transmitted simultaneously, will nevertheless arrive at a receiving location at different times.

Figure 7:
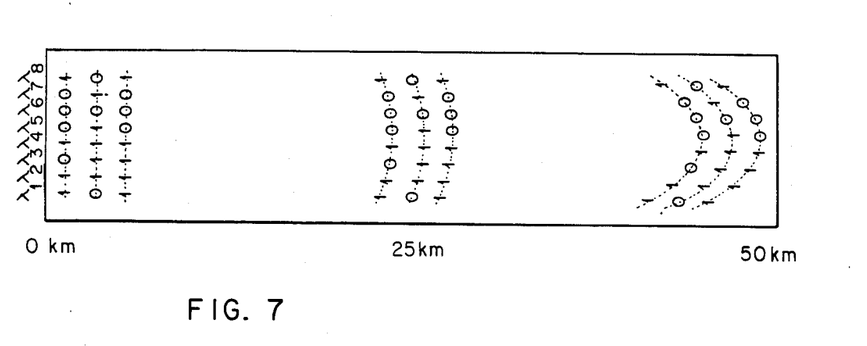
FIG. 7 is a graphic representation of the effects of frequency-related dispersion at different distances along a dispersive medium.

While the individual bits in a WDM encoded byte may be easily detected, it can be difficult to tell which bit goes with which byte if one or more bits from a given byte arrive at the receiving location before all bits of a previously transmitted byte have been received. This is illustrated in FIG. 7 which shows the time relationship between individual bits in three successive bytes as those bytes are transmitted along a dispersive transmission medium, such as an optical fiber. At the transmitting location, the bits in a given byte all occur at the same time. As the byte is transmitted along the medium, some of the bits will begin to lag others due to the frequency-related dispersion characteristics of the transmission medium. The amount of lag or bit skew increases as a function of the distance traveled until some of the bits in a given byte overlap one or bits in the succeeding byte or bytes.

Figure 6:
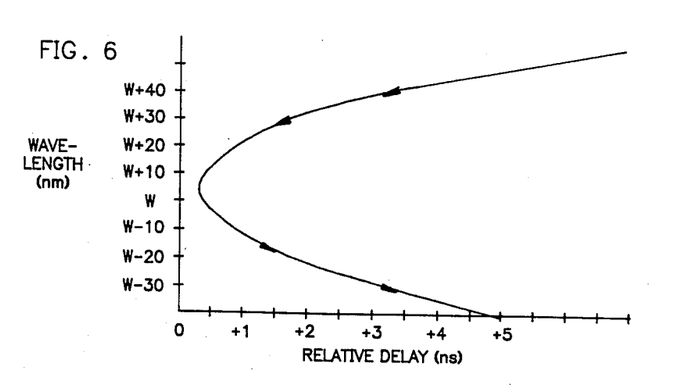
FIG. 6 is a graph of the frequency-related dispersion characteristics of a known type of transmission medium, specifically an optical fiber.

The amount of skew is a function of several variables. The carrier frequency for the bit signal is one of these variables. FIG. 6 is a graph of the relative delay (in nanoseconds) for bits modulated at certain wavelengths above and below a base wavelength having a minimum delay. It can be seen that an amount of relative delay is a function of the difference between the base wavelength and the wavelength for any other bit.

If the exact length of the transmission path were always known, a graph such as that shown in FIG. 6 could be used to establish the relative times of arrival of bits in a WDM byte so that appropriate clocking signals could be generated. The problem is that the exact length of the transmission medium is not normally known.

Figure 11:
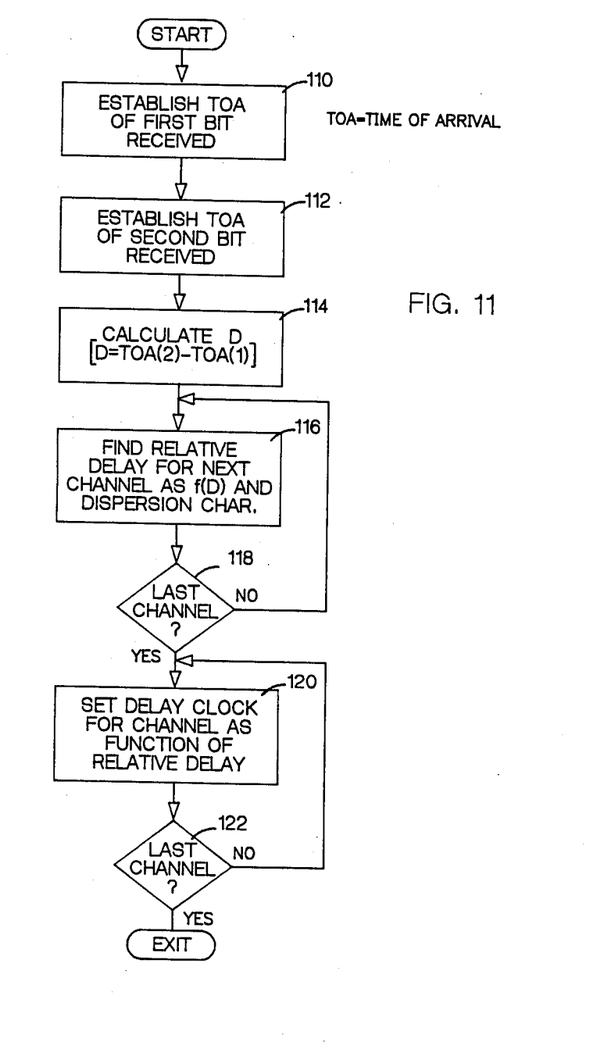
FIG. 11 is a flow chart of a process for implementing the bit deskewing technique.

The relative times of arrival of the bits in a WDM byte can be determined, however, without knowledge of the exact length of the transmission medium by using a technique which will be described with reference to the flow chart in FIG. 11. When transmissions of WDM signals begin, the signals received at a deskewing location are decomposed into bits in parallel bit channels. The times of arrival of the two bits in a byte are established (blocks 110 and 112). The two bits are preferably those which are delayed the least in transit through the transmission medium. These bits will be skewed only slightly relative to each other for optical fibers of realistic lengths. When the times of arrival have been established, the relative delay between the two bits is determined (block 114). Once the relative delay between two of the bits in the byte is known, the added relative delay for each of the remaining bits can be determined (blocks 116 and 118) as a function of the magnitude of the delay between the two "fastest" bits and the known frequency-related dispersion characteristics of the transmission medium.

It should be noted that it is not necessary to compute the absolute delay of any of the bits. Only relative delays need to be determined.

When the relative delays have been established, the delay values can be used to set delay clocks (blocks 120 and 122) for all channels other than the slowest channel. The delay clocks will cause "faster" bits to be clocked through a shift register at times which cause all bits in a byte to be brought into better time alignment relative to each other.

Figure 9:
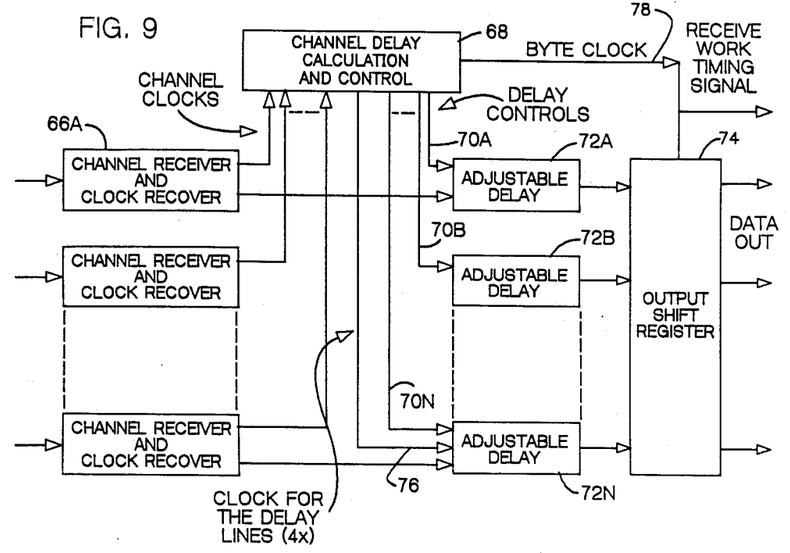
FIG. 9 is a block diagram of an apparatus for implementing the bit deskewing technique to be described.

The hardware required for deskewing bits in a WDM byte is illustrated in FIG. 9. After the composite optical signal is decomposed using elements such as those shown in FIGS. 4 and 5, the individual bit signals in each of the bit channels are applied to channel receiver and clock recovery circuits, such as circuit 66A. Such circuits, by themselves, are well known and need not be described. Each such circuit derives a bit or channel clock signal which is applied to a channel delay calculation and control circuit 68. Circuit 68 is the circuit which detects the two "fastest" bits in a byte and performs the operation generally described with reference to FIG. 11 in order to determine the relative delay between these bits and other "slower" bits in the same byte. Circuit 68 produces delay control signals on leads 70A, 70B, ... 70N which are applied to delay circuits 72, 72B, ... 72N. A single clock signal is also applied to adjustable delay circuit 72A, 72B, ... 72N over a clock line 76 from the channel delay calculation and control circuit 68. When the clock signal on line 76 is applied to the adjustable delay circuits, any bits stored in those circuits are clocked to an output shift register 74 after a delay period dependent upon the control signals previously applied to the delay circuits over delay control line 70A, 70B, . . . 70N. The delay circuits are set to retard the "faster" bits in a byte to bring them into closer time alignment with the bits which are delayed most in transit due to the frequency-related dispersion characteristics of the medium. Data bytes stored in the output shift register 74 are clocked out by a byte clock signal on line 78 from the channel delay calculation and control circuit. The deskewed data bytes can then be applied over a parallel bus 20 as shown in FIG. 1 to the target system 22 shown in that figure.

Figure 10:
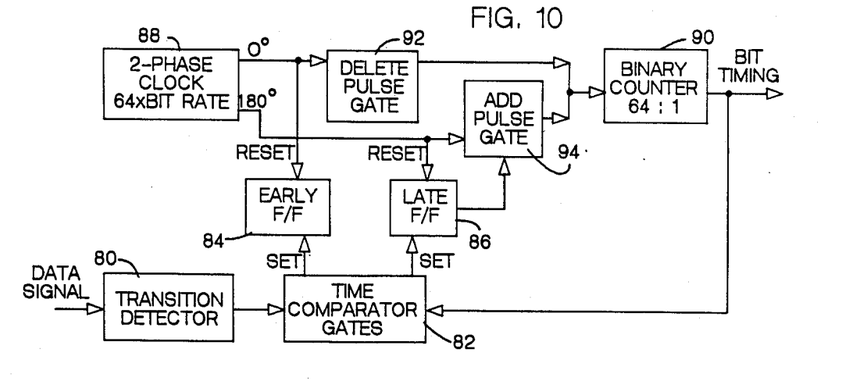
FIG. 10 is a block diagram of a clock recovery circuit which can be used in the system shown in FIG. 9.

FIG. 10 shows a clock recovery circuit suitable for use in each of the channel receiver and clock recovery circuits, such as circuit 66A in FIG. 9. Incoming data is applied to a transition detector 80. The phase of the incoming signal is compared to the phase of an output bit timing signal in time comparator gates 82. If the output signals lead the incoming signals, an early flip flop 84 is set. If the output signals lag the incoming signals, a late flip flop 86 is set. The clock recovery circuit includes a two phase clock or oscillator 88 which operates at a multiple (preferably x64) of the nominal bit rate. The $\phi°$ phase and 180° phase outputs of the two phase clock can be applied to a sixty-four bit binary counter 90 through a delete pulse gate 92 and an add pulse gate 94. If the early flip flop 84 is set, the $\phi°$ phase signal resets flip flop 84 but is prevented from reaching the binary counter 90 by the delete pulse gate 92. The accumulated count in counter 90 does not reach its maximum as quickly as it would otherwise, thereby delaying the bit timing signal produced at its output. The delayed bit timing signal is fed back to the time comparator gates 82. The pulse gate 92 will continue to delete pulses until the bit timing signal is slowed into alignment with the transitions in the input signal.

If the time comparison performed by gates 82 indicates that the output signal lags, rather than leads, the incoming signals, late flip flop 86 causes an extra pulse to be added to binary counter 90 on the 180° phase signal from oscillator 88. Each added pulse advances the phase of the output signals.

It can be seen from the foregoing that it is not necessary that the length of the transmission medium be known in order to deskew wavelength division multiplex data transmitted over the medium. The technique can be used at any transmission rate or for any length of transmission medium where the relative delay between the two "fastest" bits in a byte of data is not greater than the interval between corresponding bits of successive bytes of data.

While there has been described what is considered to be a preferred embodiment of the invention, variations and modifications will occur to those skilled in the art when the basic inventive concepts are made known to them. Therefor, it is intended that the appended claims shall be construed to include not only the preferred embodiment but all such variations and modifications as fall within the true spirit and scope of the invention.

What is claimed is:

1. A method for deskewing the bits in a byte of data transmitted in parallel bit channels using frequency division multiplexing through a medium having known frequency-related dispersion characteristics, said method comprising the steps of:

detecting the arrival at a deskewing location of bits in each of parallel bit channels;
   determining the relative delay between two detected bits in two predetermined bit channels;
   establishing the relative times of arrival of bits in the remaining bit channels as a function of the determined relative delay, the frequencies of the remaining channels and the known frequency-related dispersion characteristics of the medium.

2. A method as defined in claim 1 wherein the two detected bits are the first two bits to arrive in a given byte of data.

3. A method as defined in either of claims 1 or 2 including the additional steps of:

establishing the relative delay between the bit channels for each byte of data;
   generating delay clock signals for certain of said bit channels as a function of the established relative delay; and
   passing the bits in the bit channels to signal utilizing circuits under the control of the delay clock signals to reduce the time skew between the first and last bits to arrive in a given byte.

4. A system for deskewing the individual bits in a byte of data transmitted in parallel bit channels using frequency division multiplexing through a medium having known frequency-related dispersion characteristics, said system including:

means for detecting the arrival of bits in each of the parallel bit channels;
   means for determining the relative delay between two detected bits in predetermined ones of the bit channels; and
   means for establishing the relative times of arrival of bits in the remaining bit channels as a function of the determined relative delay, the frequencies of the remaining channels and the known frequency-related dispersion characteristics of the medium.

5. A system as defined in claim 4 further including means for delaying the further transmission of bits in certain of the bit channels as a function of the times of arrival of bits in those channels relative to time of arrival of bits in the slowest of the channels.

6. A system as defined in claim 5 wherein said delaying means further includes:

a plurality of signal delaying elements, each element receiving the output of one of the bit channels; and
   means for generating clock signals for said signal delaying elements.

7. A method for deskewing bits in successive bytes of data transmitted in parallel through a medium having known frequency-related dispersion characteristics by means of frequency division multiplexing, said method comprising the steps of:

demultiplexing the transmitted data at a receiving location to produce bit streams in parallel channels;
   determining the relative delay between two predetermined bits in a given byte of data, said bits being in different channels; and
   establishing the relative times of arrival of the bits in the remaining channels as a function of the determined relative delay, the frequencies of the remaining channels and the frequency-related dispersion characteristics of the medium.

8. A method as defined in claim 7 wherein the two predetermined bits are the first two bits to arrive in a given byte.

9. A method as defined in claim 8 further including the step of delaying the further transmission of certain of the bits in certain channels in a demultiplexed byte to reduce the amount of skew between bits in the same byte prior to utilization of the data.

10. A method as defined in either of claims 8 or 9 wherein one of the two predetermined bits is multiplexed at a frequency known to have the highest group velocity for the given medium and the other of the predetermined bits is multiplexed at a frequency known to have the second highest group velocity for the given medium.

11. A system for deskewing individual bits in successive bytes of data transmitted in parallel through a medium having known frequency-related dispersion characteristics using frequency division multiplexing, said system including:
   means for demultiplexing the transmitted data to produce parallel bit streams in parallel channels;
   means for determining the relative delay in the arrival of two bits in different predetermined channels; and
   means for establishing the relative times of arrival of bits in the remaining bit channels as a function of the relative delay, the frequencies of the remaining channels and the known dispersion characteristics of the medium.

12. A system as defined in claim 11 further including means for delaying the bits in certain of the channels to reduce the amount of skew between bits in the same byte prior to further utilization of the data in the byte.

13. A system as defined in claim 12 wherein said delaying means comprises:
   a plurality of signal delaying elements, each of said elements receiving the output of one of the bit channels, and
   means for generating clock signals for said signal delaying elements to clock data through said elements at times dependent upon the relative delays so as to reduce the time skew between bits in the various channels.

* * * * *